US010293256B2

(12) United States Patent
Cao (10) Patent No.: US 10,293,256 B2
(45) Date of Patent: May 21, 2019

(54) SYSTEM AND METHOD FOR PROVIDING PERSISTENT CHARACTER PERSONALITIES IN A SIMULATION (71) Applicant: DAYBREAK GAME COMPANY LLC, San Diego, CA (US)

(72) Inventor: Christopher Udo Cao, San Diego, CA (US)

(73) Assignee: Daybreak Game Company LLC, San Diego, CA (US)

( * ) Notice: Subject to any disclaimer, the term of this patent is extended or adjusted under 35 U.S.C. 154(b) by 30 days.

(21) Appl. No.: 15/405,238

(22) Filed: Jan. 12, 2017

(65) Prior Publication Data

US 2017/0120149 A1 May 4, 2017

Related U.S. Application Data (62) Division of application No. 12/507,684, filed on Jul. 22, 2009, now Pat. No. 9,579,576.

(Continued)

(51) Int. Cl.
*A63F 13/47* (2014.01)
*A63F 13/52* (2014.01)
(Continued)

(52) U.S. Cl.
CPC .............. *A63F 13/52* (2014.09); *A63F 13/12* (2013.01); *A63F 13/47* (2014.09); *A63F 13/54* (2014.09);
(Continued)

(58) Field of Classification Search
CPC ............ A63F 2300/65; A63F 2300/632; A63F 2300/64; A63F 2300/6027
(Continued)

(56) References Cited

U.S. PATENT DOCUMENTS 6,951,516 B1 10/2005 Eguchi et al.
2004/0038739 A1 2/2004 Wanat
(Continued)

FOREIGN PATENT DOCUMENTS

CN 1433638 A 7/2003
JP H10211359 A 8/1998
(Continued)

OTHER PUBLICATIONS

Kathryn Merrick, et al., Motivated Reinforcement Learning for Non-Plyer Characters in Persistent Computer Game Worlds, ACE, Jun. 14-16, 2006, 8 Pages, http://portal.acm.org/citation.cfm?id=1178828.
(Continued)

*Primary Examiner* — Omkar A Deodhar
*Assistant Examiner* — Ross A Williams
(74) *Attorney, Agent, or Firm* — Lorenz & Kopf, LLP (57) ABSTRACT

Apparatus and methods are provided to implement a technique for managing the response of a digital entity in a simulation to reflect its interaction with one or more players over time, such as managing a non-player character's responses to player characters in an online computer game. In the system, a computer system tracks the interaction of the digital entity with other entities and the occurrence or status of internal and external events to control how the digital entity reacts to current events and interactions.

12 Claims, 5 Drawing Sheets

Related U.S. Application Data (60) Provisional application No. 61/082,653, filed on Jul. 22, 2008.

(51) Int. Cl.
*A63F 13/67* (2014.01)
*A63F 13/30* (2014.01)
*A63F 13/54* (2014.01)

(52) U.S. Cl.
CPC ...... *A63F 13/67* (2014.09); *A63F 2300/5533* (2013.01); *A63F 2300/6027* (2013.01); *A63F 2300/632* (2013.01); *A63F 2300/64* (2013.01); *A63F 2300/65* (2013.01)

(58) Field of Classification Search
USPC .............................. 463/1–6, 30–33, 40–42
See application file for complete search history.

(56) References Cited

U.S. PATENT DOCUMENTS

| | | | |
|---|---|---|---|
| 2004/0143852 A1 | 7/2004 | Meyers | |
| 2006/0040718 A1 | 2/2006 | Davis | |
| 2006/0148545 A1 | 7/2006 | Rhyne, IV et al. | |
| 2007/0117636 A1 | 5/2007 | Takahashi et al. | |
| 2007/0265045 A1 | 11/2007 | Takai | |
| 2008/0318676 A1* | 12/2008 | Ham ..................... | A63F 13/10 463/35 |

FOREIGN PATENT DOCUMENTS

| | | |
|---|---|---|
| JP | 2005536257 A | 12/2005 |
| WO | WO2009002713 A2 | 12/2008 |

OTHER PUBLICATIONS

Persistent World, Wikipedia, Downloaded Mar. 25, 2009, http://en.wikipedia.org/wiki/Persistent world.

Patrick Doyle, Virtual Intelligence From Artificial Reality: Building Stupid Agents in Smart Environments, 1999, AAAI Technical Report SS-99-02, Knowledge Systems Laboratory, Stanford University.

European Patent Office, Notice Concerning Business Methods, Oct. 1, 2007.

Neoseeker.com Forum, Thread: RPMaker XP: How Should I Go About Building a Relationship/Dating System, Dec. 24, 2007, pp. 1-3, http://www.neoseeker.com/forums/22121/t1063358-rpmaker-xp-how-should-go-about-building-relationship-dating-system/.

Petri Lankoski, Building and Reconstructing Character. A Case Study of Silent Hill 3, 2005, pp. 1-7, Hypermedia Laboratory, University of Tampere, Proceedings of DIGRA 2005 Conference, http://www.digra.org/wp-content/uploads/digital-library/06278.03293.pdf.

Stephen Grande, Creating Autonomous Non-Player Characters in Interactive Fiction, May 26, 2008, https://web.archive.org/web/20080526094401/http://brasslantern.org/writers/liftheory/autonomousnpcs.html.

* cited by examiner

SYSTEM AND METHOD FOR PROVIDING PERSISTENT CHARACTER PERSONALITIES IN A SIMULATION

CROSS-REFERENCE TO RELATED APPLICATIONS

This application is a divisional of U.S. patent application Ser. No. 12/507,684, filed Jul. 22, 2009 and issued as U.S. Pat. No. 9,579,576 on Feb. 28, 2017, which claims the benefit of U.S. provisional patent application No. 61/082,653, filed Jul. 22, 2008.

TECHNICAL FIELD

Embodiments of the subject matter described herein relate generally to video game technology. More particularly, embodiments of the subject matter relate to massively multiplayer online video game technology.

BACKGROUND

Massively multiplayer online ("MMO") games enjoy tremendous popularity, with some games numbering players in the hundreds of thousands or even millions. Such games' players typically control one or more player characters, and these player characters interact with other player characters as well as with non-player characters, i.e., characters controlled by the system, and further interact with the game environment itself.

A central design goal for an MMO is to bring the world and characters of the game environment to life. Giving the game environment believable characters and features requires that the experience be engaging, deep, and immersive.

Typical cut scenes or narrative voice overs (VO) are used to enliven characters in a game. However, players have certain expectations of properties with well-known or iconic characters, e.g., licensed superheroes, and in a game setting, the game environment should make each iconic character feel rounded and real. The environment should connect players with such characters personally and socially, creating an illusion that the characters have lives and ambitions beyond any one interaction a player may have with them.

In other words, part of the immersion experience for a player is to have realistic and/or engaging responses from non-player characters and the environment. In prior systems, such responses have had little or no reliance on a player character's prior actions or on game (or world) events. To the extent they did, they were based on prior quests completed, or other such generic game variables.

BRIEF SUMMARY

Implementations of the system and method enhance the realism of a simulation such as an MIO by enhancing the relationship of non-player characters to player characters, using, e.g., personal contact, social communication, and shared history. Personal contact means that the player character acts alongside the non-player character, in many cases fighting with or against the player character. Quests, tasks, or the like, are arranged such that the non-player character purposely encounters the player character. Social communication is described in more detail below and pertains to acts and speech which communicate information from the non-player character to a player character. For personal contact and social communication, a given non-player character may have a range of responses, based on, e.g.: variety (to avoid repetition), relationship with the player character, and framing (to give context to what the player character is doing). Another category, shared history, provides a way for a player character to learn more about a non-player character. For example, the player character may find a newsreel with footage about the origin of the non-player character. The level of depth for which information about a non-player character may be available may depend on the category of non-player character, e.g., primary, secondary, global, or generic.

In the social communication aspect, the system and method provide ways to make a non-player character act and communicate in a more realistic fashion, in particular, by using historical events such as prior interactions to make the non-player character's acts and communications more relevant to player characters (and thus players). In particular, the response of a non-player character to a player character action may be via one or more of various actions: a verbal response, an emotive response such as a frown, grin, or smile, or a physical response such as running away, attacking, a clap on the back, or the like. The non-player character's responses, whether actions or communications, are based on more than just standard game variables. The responses are based on the experiences of the player character, including milestones, actions, communications, as well as on in-game or world events, or in-game interpretations of world events. In essence, non-player characters are made to act and communicate as if their personalities were persistent and dynamic. This may be particularly important in the MIO environment because of its persistent nature. Non-player characters are made to appear to react to player character actions over time. They appear to form an opinion of a player character over time and this opinion can be made to affect and modify the player's experience.

To accomplish the above, data is tracked pertaining to the interaction(s) of a subject player character with other player characters and non-player characters. Non-player character responses may be based not only on interactions with the subject player character, but also on the subject player character's interactions with other player characters and non-player characters, as well as the player character's interactions with the environment, e.g., tasks attempted and subsequent results. Tracked data may also pertain to events that are relevant with or to a subject player character. In any case, tracked data may be stored on a game server.

In one aspect, the invention is directed toward a computer-readable medium, comprising instructions for causing a processor in an electronic device to perform a method of generating responses of a non-player character in a simulation. The method includes steps of: receiving a first signal from a client computing device, the first signal indicating that a player character has initiated a communication with a non-player character; calculating a response to the first signal, where the calculating includes calculating a response based on one or more acts performed by the player character prior to the receiving; and transmitting a second signal, corresponding to the response, to the client computing device, the response in part causing a video renderer or sound renderer in the client computing device to render an indication of the response on a video or audio device, respectively, or both.

Implementations of the invention may include one or more of the following. The calculating a response based on one or more acts performed by the player character prior to the receiving may include calculating a response based on one or more quests or tasks accomplished or attempted by the player character, one or more prior communications or interactions between the player character and the non-player character, or one or more prior communications or interactions between the player character and other player characters or non-player characters. The calculating a response may further include choosing one of a plurality of responses at random, or calculating a response based on one or more in-game events.

In another aspect, the invention is directed toward a computer-readable medium, comprising instructions for causing a processor in an electronic device to perform a method of enabling interactions of player characters with non-player characters in a simulation. The method includes steps of receiving a first signal, the first signal indicating that a player character is within a predetermined distance from a personal contact spawning point; and upon the receiving, transmitting a second signal to the client computing device, the second signal indicative of a contact between the player character and a non-player character. The second signal causes one or more of the following: a rendering of a communication of the non-player character addressing the player character, the rendering performed by a video renderer or a sound renderer, the rendering indicating the initiated contact on a video or an audio device, respectively, or both; a locating and rendering of the non-player character in a vicinity of the player character, the rendering performed by a video renderer or a sound renderer on a video or an audio device, respectively, or both; or an arranging and rendering of the non-player character in a situation with the player character such that the non-player character is working with or against the player character to accomplish a common task, objective, or goal, the rendering performed by a video renderer or a sound renderer on a video or an audio device, respectively, or both.

Implementations of the invention may include one or more of the following. The rendering a communication may be based on one or more acts performed by the player character prior to the receiving, including one or more quests or tasks accomplished or attempted by the player character, one or more prior communications or interactions between the player character and the non-player character, or one or more prior communications or interactions between the player character and other player characters or non-player characters. The rendering a communication may include a step of choosing one of several potential communications at random, or may be based on one or more in-game events.

In yet another aspect, the invention is directed toward a computer-readable medium, comprising instructions for causing a processor in an electronic device to perform a method of providing information about a non-player character to a player character in a simulation. The method includes: receiving a first signal, the first signal indicating that a player character is within a predetermined distance from a shared history spawning point; upon receipt of the first signal, transmitting a second signal to the client computing device, the second signal causing the client computing device to display an activatable element corresponding to information about a non-player character; and upon receipt of a third signal corresponding to an activation of the displayed element, transmitting a fourth signal to the client computing device, the fourth signal causing the client computing device to play back a media file corresponding to the information about the non-player character.

Implementations of the invention may include one or more of the following. The causing the client computing device to play back a media file may include choosing a media file to play, wherein the choosing includes choosing a media file based on one or more quests or tasks accomplished or attempted by the player character, one or more prior communications or interactions between the player character and the non-player character, or one or more prior communications or interactions between the player character and other player characters or non-player characters. The choosing a media file to play may further include choosing one of a plurality of media files at random. The causing the client computing device to play back a media file may include causing the client computing device to play back a cinematic sequence or a cut scene. The causing the client computing device to play back a media file may include choosing a media file to play, and the choosing may be based on an in-game event.

In a further aspect, the invention is directed toward a computer-readable medium comprising a system for enhancing responses of a non-player character in a multiplayer game. The medium including the following modules: a database module for storing data about a plurality of player characters, a plurality of non-player characters, and a plurality of features in a game environment; and a response calculating module for calculating responses of non-player characters to player character interactions, where the response calculating module is configured to calculate a response based on one or more acts performed by the player character, or to alternatively calculate a response based on one or more in-game events.

Implementations of the invention may include one or more of the following. The calculating module may be configured to calculate a response based on one or more quests or tasks accomplished or attempted by the player character, one or more prior communications or interactions between the player character and the non-player character, or one or more prior communications or interactions between the player character and other player characters or non-player characters.

In another aspect, the invention is directed toward a computer-readable medium comprising a system for enabling interactions of player characters with non-player characters in a multiplayer game. The medium includes the following modules: a database module for storing data about a plurality of player characters, a plurality of non-player characters, and a plurality of features in a game environment; and a response calculating module for calculating responses to player character interactions, where the response calculating module is configured to, upon receipt of a first signal indicating that a player character is within a predetermined distance from a personal contact spawning point, transmit a second signal to the client computing device, where the second signal causes one or more of the following: a rendering of a communication of the non-player character addressing the player character, the rendering performed by a video renderer or a sound renderer, the rendering indicating the initiated contact on a video or an audio device, respectively, or both; a locating and rendering of the non-player character in a vicinity of the player character, the rendering performed by a video renderer or a sound renderer on a video or an audio device, respectively, or both; or an arranging and rendering of the non-player character in a situation with the player character such that the non-player character is working with or against the player character to accomplish a common task, objective, or goal, the rendering performed by a video renderer or a sound renderer on a video or an audio device, respectively, or both.

Implementations of the invention may include one or more of the following. The communication may be based on one or more acts performed by the player character prior to the receiving, which may include one or more quests or tasks accomplished or attempted by the player character, one or more prior communications or interactions between the player character and the non-player character, or one or more prior communications or interactions between the player character and other player characters or non-player characters.

In another aspect, the invention is directed toward a computer-readable medium, comprising a system for providing information about a non-player character to a player character in a multiplayer game. The medium includes the following modules: a database module for storing data about a plurality of player characters, a plurality of non-player characters, and a plurality of features in a game environment; and a response calculating module for calculating responses to player character interactions. The response calculating module is configured to, upon receipt of a first signal indicating that a player character is within a predetermined distance from a shared history spawning point, transmit a second signal to the client computing device, where the second signal causes a client computing device to display an activatable element corresponding to information about a non-player character. The response calculating module is configured to, upon receipt of a third signal corresponding to an activation of the displayed element, transmit a fourth signal to the client computing device, the fourth signal causing the client computing device to play back a media file corresponding to the information about the non-player character.

Implementations of the invention may include that the media file is selected based on an occurrence of an in-game event, and may be a cinematic.

Advantages of the invention may include one or more of the following non-limiting examples. Non-player character responses are made so as to be more realistic by choosing or developing the responses, for a given player character, based on tracking data reflecting that player character's interactions with the non-player character, with other non-player characters and player characters, on characteristics of the player character or an associated player or user, on in-game events, on real-world events, or the like. Non-player characters may be made more realistic by having the same act alongside or against player characters in scenarios, as well as by revealing non-player character backstories by having player characters find, watch, listen to, or otherwise consume clues about the same. Other advantages will be apparent from the following description, including the figures and claims.

DETAILED DESCRIPTION

Figure 1:
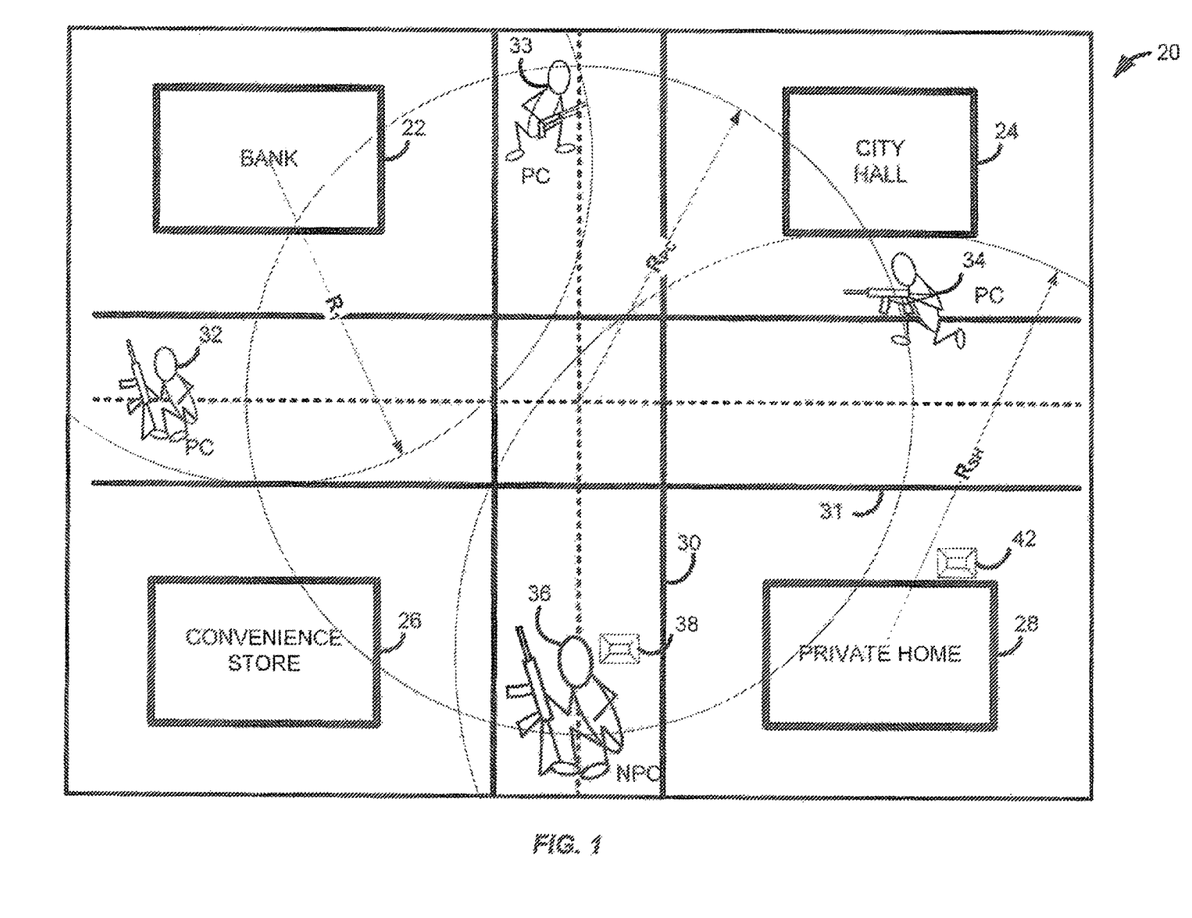
FIG. 1 illustrates an exemplary environment of the simulation, e.g., a multiplayer game, and further illustrates how proximity to certain locations (or characters) may be employed to enhance the level of a player's immersion by providing scenarios and responses that are relevant to that player.

Referring to FIG. 1, an exemplary environment of the simulation, e.g., a multiplayer game, is illustrated. The environment may vary widely, and may be, e.g., a fantasy simulation, a science fiction simulation, a space simulation, a real world simulation, a city simulation, an apocalyptic simulation, a superhero simulation, and so on. The exemplary simulation of FIG. 1 shows a number of characters 32, 33, 34, and 36, and the same are shown traversing various streets 30 and 31 within a game environment 20. In FIG. 1, the characters 32, 33, and 34 are intended to portray player characters, controlled by players. The same interact with other players' player characters as well as with computer-controlled characters, termed non-player characters. The character 36 is intended to portray a non-player character, controlled by the simulation or game engine. That is, a non-player character is controlled by the simulation, either at the server level or by the client software, and the same acts in a way dictated by the software instructions and data set for that non-player character. A player may interact with the non-player character 36 by clicking on or otherwise activating icon 38, this icon associated with the non-player character 36. In some implementations, the player may also click directly on the non-player character.

A number of city features are also shown, such as a bank 22, a city hall 24, a convenience store 26, and a private home 28. The features will vary according to the applicable game environment. An icon 42 is also indicated adjacent the private home 28. The user may click on such an icon 42 to, e.g., direct their focus to the private home 28 to perform any number of associated tasks, e.g., to rescue an occupant, prevent a crime, or the like. Each structure may have such an activatable element, according to the degree of interaction intended between player characters and the given structure.

A number of radii and circles, both full and partial, are illustrated, indicating how proximity to certain locations (or characters) may be employed to enhance the level of a player's immersion by providing scenarios and responses that are relevant to that player. For example, the center of the intersection of streets 30 and 31 serves as the locus of a circular zone of radius $R_{player\ character}$ or $R_{personaContact}$. Similarly, the private home 28 serves as the locus of a circular zone of radius $R_{SH}$ or $R_{SharedHistory}$. And in the same way, the bank 22 serves as the locus of a circular zone of radius $R_1$.

Proximity to certain locations is just one way to initiate interactions that provide enhanced scenarios and responses. Other ways may include providing an activatable object that tells a player character about a non-player character, initiating an interaction where a non-player character plays alongside a player character, having a non-player character respond in a way that takes account of a player character's prior actions and exploits, or the like. Non-player characters within the game react to players, and their associated player characters, with a range of emotional responses cued by real-world events, player milestones, and player actions. They act as if their personalities are persistent and dynamic based on their personal history with a player character. This is not necessarily only a factional response, e.g., based on the player's reputation with a particular group for which the non-player character has a response set. Rather, it may be a deep series of verbal reactions, stories, and attitudes that convey the relationship status between the player and the character.

These and other aspects are discussed below in connection with FIGS. 3-5.

Figure 2:
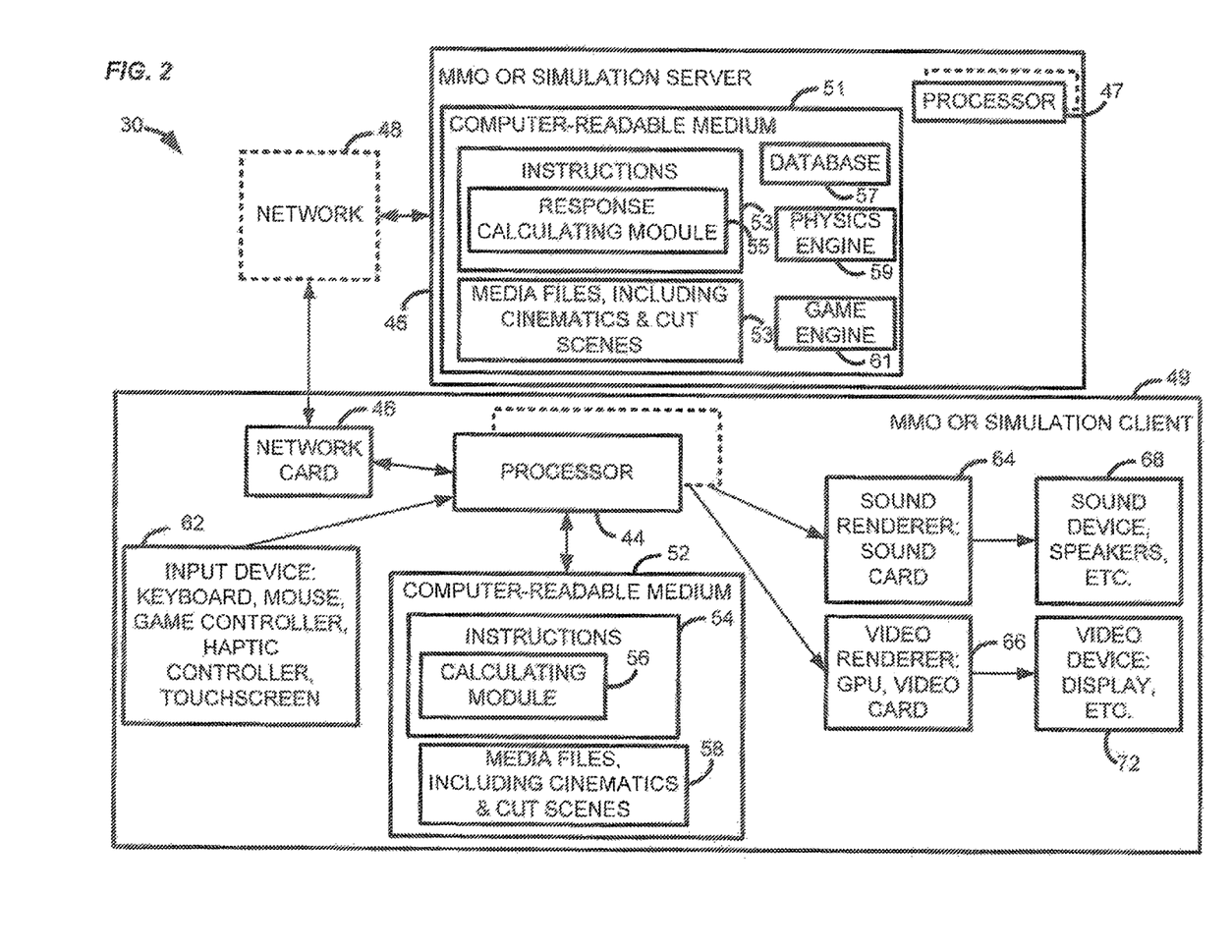
FIG. 2 illustrates a logical diagram of a system that may be employed to implement a simulation such as a multiplayer game, including a client-server architecture.

FIG. 2 illustrates a logical diagram of a system 30 that may be employed to implement a simulation such as a multiplayer game. The system 30 includes an MMO or simulation client computing device 49 and an MMO or simulation server 45 which communicate by way of a network 48. The client computing device 49 includes one or more processors 44 which communicates with the network 48 via a network card 46 or via a network-enabled processor (not shown). The client computing device 49 has client software running which enables communication with the network 48 and server 45.

The client computing device 49 includes at least one input device 62, which may include a keyboard, mouse, game controller, haptic controller, touchscreen, or other devices which may provide an input to a computer. The client 49 further includes a computer-readable medium 52, such as a hard drive, flash memory, solid state drive, or the like, which stores instructions 54 for the processor 44, including calculating module 56. The computer-readable medium 52 may also store media files 58, including graphics files, cinematics files, and media files for cut scenes. These media files may also be streamed when needed from the server 45. In some implementations, certain media files may be downloaded to the client, especially those that are often used, and others may be kept at the server for later streaming, to avoid cluttering the client system. Certain media files are may also be cached at the client system, such as those pertaining to the immediate game locale of the player character.

The system 30 also includes a sound renderer 64, such as a sound card, by which signals pertaining to game sounds may be put in a form suitable for playing on a sound device 68, e.g., computer speakers. Moreover, the system 30 also includes a video renderer 66, such as one or more GPUs or video cards, or both, by which signals pertaining to game video may be put in a form suitable for playing on a video device 72, e.g., a computer display.

The simulation server 45 controls the game, and may be a game server having a processor 47 and running a game engine 61 and other components, including a physics engine 59, user interface, input/output components, a database 57, and the like. Certain of these components or modules may be implemented on a computer-readable medium 51, which includes instruction 53 for carrying out these and other processes, including module 55 for calculating responses of non-player characters to player character actions. The computer-readable medium 51 may also include media files, including cinematics and cut scenes, for downloading or streaming to client computing devices 49.

Figure 3:
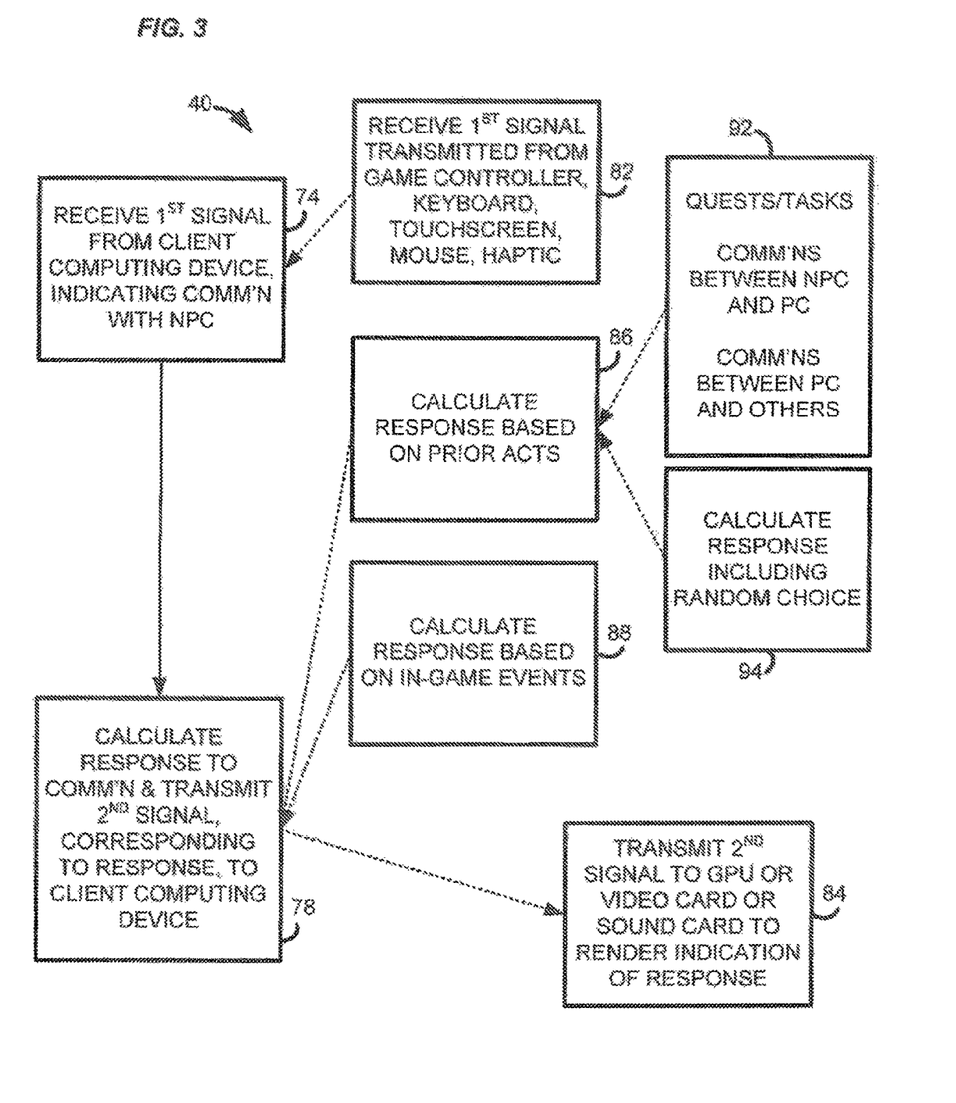
FIG. 3 is a flowchart of a method for implementing one embodiment of the invention, in particular employing social communication.
Figure 4:
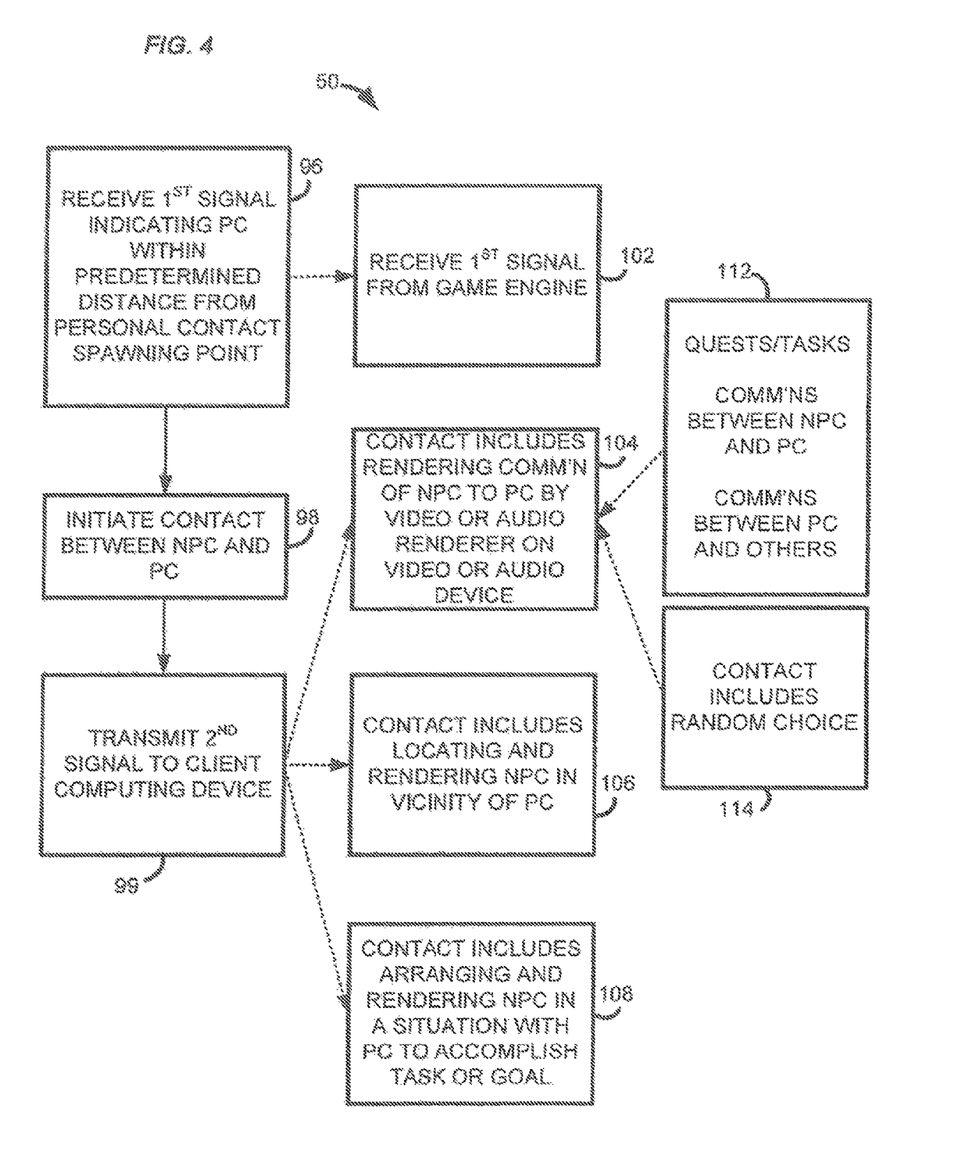
FIG. 4 is a flowchart of a method for implementing another embodiment of the invention, in particular employing personal contact.
Figure 5:
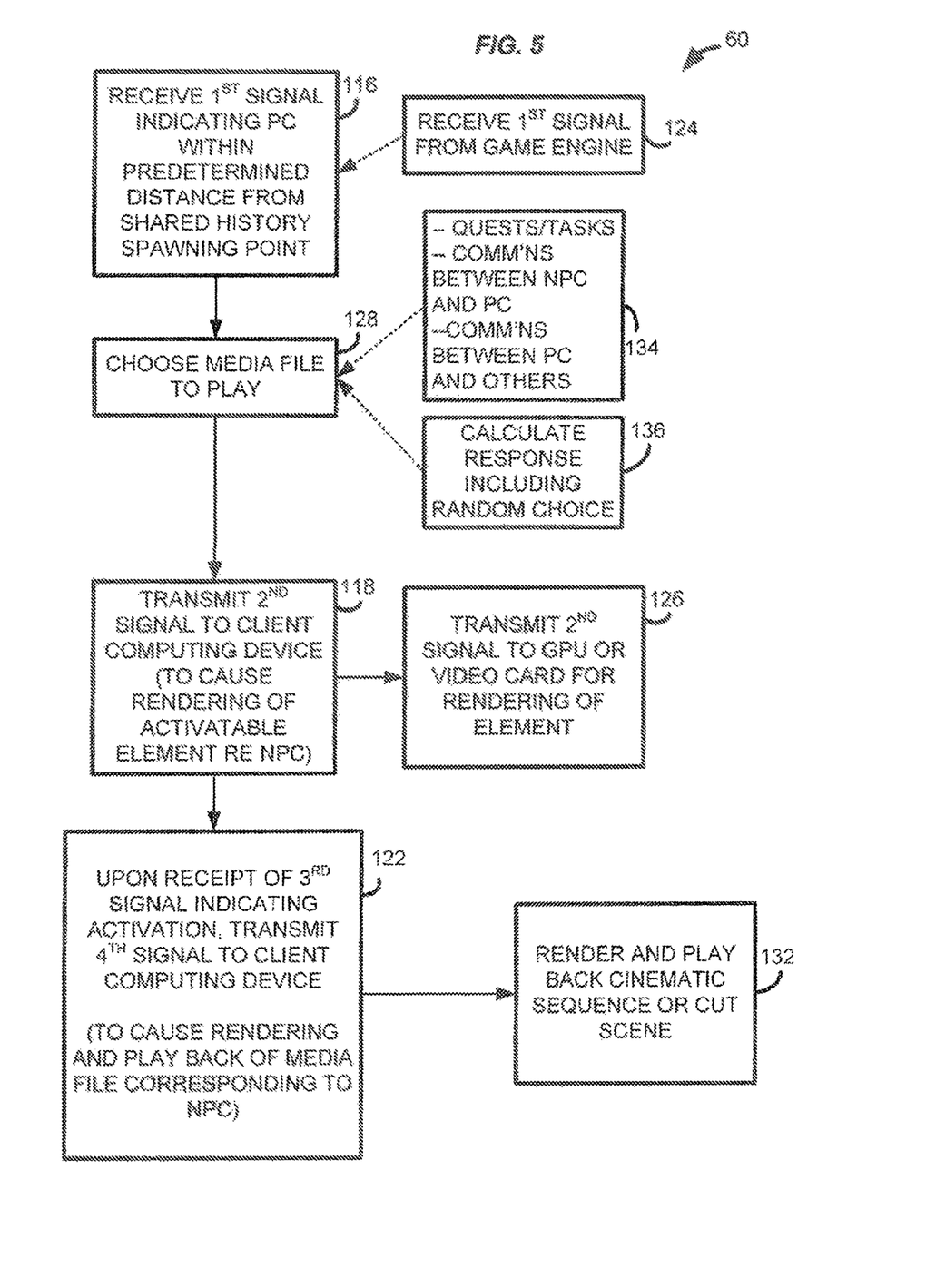
FIG. 5 is a flowchart of a method for implementing yet another embodiment of the invention, in particular employing shared history.

FIGS. 3-5 are flowcharts that illustrate certain ways to increase player immersion, primarily by enhancing the relationship of non-player characters to player characters. In particular, ways to enhance the relationship of non-player characters to player characters may include social communication, personal contact, and shared history.

The first way, an implementation of which is shown in FIG. 3, is via social communication, which pertains to acts and speech which communicate information from the non-player character to a player character. In this aspect, the system and method provide ways to make a non-player character act and communicate in a more realistic fashion, in particular, by using historical events such as prior interactions, to make the non-player character's acts and communications more relevant to player characters (and thus players). In particular, the response of a non-player character to a player character action may be via one or more of various actions: a verbal response, an emotive response such as a frown, grin, or smile, or a physical response such as running away, attacking, a clap on the back, or the like. By way of the implementations of the system and method, the non-player character's responses, whether actions or communications, are based on more than just standard game variables. The responses are based on the player character, including milestones, actions, communications, as well as on in-game or world events, or in-game interpretations of world events. The responses may also be based on the player associated with the player character, including birthdays, anniversaries, and the like.

In the exemplary method 40 of FIG. 3, a first step is to receive a first signal from a client computing device, the first signal indicating that a player character has initiated a communication with a non-player character (step 74). For example, and referring back to FIG. 1, a player character may click on an activatable element or icon 38 associated with the non-player character 36. Step 74 may include a step of receiving the first signal via the client computing device receiving a signal from an input device, e.g., from a game controller, keyboard, mouse, touchscreen, haptic controller, or via any other input device (step 82). The player may activate the element, icon, or non-player character for any number of reasons, including a request to converse, transact business such as to buy or sell items or trade skills, attack, subdue, protect, observe, rescue, transport to or away from a target location, and others.

This activating step, while sometimes employed, is not required in many implementations. That is, a non-player character may provide a response to a player with no activation step—the non-player character may provide the response, e.g., if the player character is within a certain proximity of the non-player character or a predetermined landmark. For example, as indicated in FIG. 1, the player character 32 is shown within a radius $R_1$ from the bank 22, and this proximity may be employed as a response trigger for a nearby non-player character. In the case where a response is triggered if a player character comes within a certain proximity or radius of a non-player character, then this radius may move if the non-player character moves.

Another way for a non-player character to interact with a player character is by way of a communication screen, or "communicator". This is a pop-up display in the player's user interface that simulates a video phone call from the non-player character to the player character. Other aspects of such a response are described below in connection with ally personalization.

An optional step is to provide some indication to the player that they have activated, "clicked on", or otherwise initiated a communication with the non-player character. This step may be accomplished by, e.g., highlighting or otherwise distinguishing the non-player character.

A second step is to calculate a response to the first signal, and transmitting a second signal back to the client computing device (step 78). The second signal, or another signal based thereon, is transmitted to a renderer and a rendering step is performed; this step may be accomplished, for example, by transmitting a second or corresponding signal to a GPU or video card or sound card (step 84) to render an indication of the response. The indication may be, e.g., an audio playback of words spoken by the non-player character, a textual indication of words so spoken, both, or the like.

The step 78 of calculating a response to the communication may be accomplished in a number of ways. For example, a response may be calculated based on prior acts of the player character (step 86). In other words, responses may be based on quests or tasks performed by the player character, prior communications between the player character and the non-player character, or prior communications between the player character and other characters, e.g., player characters or non-player characters, or combinations of these (step 92). Responses may also be given a degree of randomness (step 94). For example, a number of potential responses may be calculated using step 92, and a random choice may then be made between the potential responses. The random choice ensures some degree of variety, variability and believability in the non-player character's response.

Another way to calculate a response is based on in-game events (step 88). For example, an in-game event may give rise to all player characters being offered certain quests or tasks related to the event. A calculated response may incorporate a mention of the in-game event or a mention of the related quests or tasks. As is known, in-game events may often be related to real life events or holidays.

In one implementation, responses may depend on player histories in the following way. Player activities across all play sessions are logged and metrics created. This metrics constitutes metadata which is then employed to drive the non-player character's state in relation to the player character. By playing the game and interacting with the non-player character, the player may skew this base state into a variety of alternate conditions. Thus there is an overall range of reactionary states in which a non-player character can be, and the player's behavior determines where on this spectrum the non-player character's responses fall.

Generally, not all non-player characters will be provided with a rich backstory. In some cases, only iconic characters are provided with such, or other characters which the developer desires to have a deeper level of communication with a player character. The amount and kind of characterization may depend primarily on the status of the player's relationship with the non-player character.

Non-player character responses for social communication may be categorized in the following non-limiting way. A first is "ally personalization" responses, e.g., voice-overs. These are responses that a non-player character sends directly to the player based on actions the player has taken, and may range from congratulations for quests successfully accomplished to admonishments for failure. Such responses may also include personal events in a player's life, such as birthdays or other important dates. Other types of ally personalization, often provided via text or voice-over, include: requests, where a non-player character requests that a player character undertake an action, and there may be variants of these requests depending on relationship or location; affirmation anchors, where a non-player character affirms actions a player character has taken; admonishment anchors, where a non-player character admonishes a player character for taking certain actions; temporal responses, where a non-player character responds to a player character in such a way as to make the player feel that the non-player character is aware of temporal events and their connection to the player, and may include past events such as anniversaries of accomplishments the non-player character and player character shared, present events such as the time of day or season, future events such as prompts or holidays established in-game or out-of-game, or personal events such as a birthday, the anniversary of the date the player began playing the game, accomplishments, or the like (assuming the same is in-character and appropriate for the non-player character to acknowledge).

Another type of response is "enemy personalization" responses, e.g., voice-overs. These are responses that a non-player character targets at a player character with a negative connotation, such as mocking or the like. These responses may also include memorable anniversaries, such as the non-player character reminding a player character of a previous battle or the like. Other types of enemy personalization, often provided via text or voice-over, include: challenge responses, where an enemy non-player character desires to challenge the player character to a face-to-face confrontation or to trick them into an action, and there may be variants of this based on relationship or location; curse or critical responses, which are negative versions of affirmations, where a non-player character curses or otherwise criticizes actions a player character has taken; temporal responses, which are similar to those described above in connection with ally personalization, but where the non-player character responds to a player character in a negative way.

Yet another type of response is related to in-game events, e.g., a non-player character's response reacting to events in-game. Such responses may include commands to players, e.g., missions, commentary, or opinions. Such responses may also include responses about group accomplishments.

Yet another type of response is a framing response, which may include the responses that a non-player character will employ to frame any content they are concerned about but not directly involved with. For example, a superhero may use a voice-over to let a player character know of an event at a given location, and that the superhero wants the player character to investigate. Such responses may be generally based on the content the character is involved in, and may be further divided into scenario type and location.

Another way to enhance the relationship of non-player characters to player characters, an implementation of which is shown in FIG. 4, is via personal contact. Personal contact, also termed "action characterization," means that the player character acts alongside the non-player character, in many cases fighting with or against him or her. In this implementation, quests, tasks, or the like, are arranged such that the non-player character purposely encounters the player character.

Referring to a method 50 depicted in the flowchart of FIG. 4, a first step may include receiving a first signal indicating that a player character is within a predetermined distance from a personal contact spawning point (step 96). For example, in the implementation of FIG. 1, player characters 33 and 34 are within a distance $R_{player\ character}$ from a personal contact spawning point, but player character 32 is not. This first step may include a step of receiving the first signal from the game engine (step 102), as the game engine may be the best source of data about where characters are in relation to each other and in relation to events of interest. Besides proximity to predefined locations, other triggers may be employed, including character mentions of keywords, proximity to certain non-player characters, and the like.

A second step is to initiate contact between a non-player character and the player character (step 98). The second step may be accomplished in a number of ways; in each way, generally, a second signal is transmitted to the client computing device (step 99). For example, a communication may be made from the non-player character to the player character, and the communication may then be rendered on the client computing device by a video or audio renderer (step 104). The communication may be a response that is calculated based on prior acts of the player character (step 112), such as quests or tasks performed by the player character, prior communications between the player character and the non-player character, or prior communications between the player character and other characters, e.g., player characters or non-player characters, or combinations of these. Responses may have a degree of randomness (step 114), for the same reasons and by the same techniques as indicated above in connection with steps 92 and 94.

Another type of contact that may be initiated is to locate the non-player character in the vicinity of the player character (step 106). For example, the system may situate an iconic non-player character in the same vicinity as the player character, and the player character may then take the opportunity to play alongside, or against, the non-player character. In this case, the second signal causes the rendering of the non-player character in the vicinity of the player character.

In another example, the system may arrange a non-player character in a situation with the subject player character such that there is a common goal the two must accomplish, or alternatively work against each other to accomplish (step 108). In this case, the second signal causes the rendering of the non-player character in the vicinity of the player character and the notification of the player of the goal or goals the non-player character and player character are striving toward.

Generally, only non-player characters that are or will be part of actual gameplay scenarios may have this type of personal contact. The depth and scope of the personal contact may depend on the number of times the content calls for the non-player character to interact directly with players.

Non-player character responses for personal contact may be categorized in the following non-limiting way. Non-player characters may be provided with ally scenario responses, e.g., ally scenario voice-overs, for situations where the player character being addressed is an ally. Ally scenario responses may include: greetings, used at the beginning of a scenario, and which may include variants based on location or relationship to a player character, as well as variants based on the urgency of the scenario; objective responses, which are used to direct the player to accomplish specific tasks in an encounter, and which may include attacking, securing, protecting, transporting, destroying, or collecting a target; affirmation responses, which may be used to have the non-player character affirm the player character for successes, and different degrees of affirmation may be provided based on a player's qualitative or quantitative completion of an objective; admonishment responses, which are used to admonish the player character for mistakes, and as with affirmations different degrees of admonition may be provided; call-out responses, which are used by the non-player character as quick commands, such as "look out", "over there", or "stay back"; and culmination responses, employed at the completion of a scenario, and which may include variants based on location or relationship to a player character, as well as variants based on the scenario.

Similarly, non-player characters may be provided with enemy scenario responses, e.g., enemy scenario voice-overs, for situations where the player character being addressed is an enemy. Enemy scenario responses may include: interaction responses, which are generic responses employed to establish a non-player character or player character within the scenario; curse responses, which are employed when a player character is successful at a task, and there may be variants of this depending on the player character's degree of success; criticism responses, which are employed when a player character fails at a task, and there may be variants of this depending on the player character's degree of failure; call out responses, which are used by the non-player character as quick commands to his or her minions; and culmination responses, employed at the completion of a scenario, and which may include variants based on location or relationship to a player character, as well as variants based on the scenario.

Other potential personal contact responses include social responses, which again may be voice-overs or the like, and which may be the generic responses used by a non-player character in social settings. Social responses may include: greetings, used to greet player characters, and which may include variants based on location or relationship to a player character; affirmation anchor responses, which may have scenario and relationship variants and which may be used to have the non-player character affirm the player character for actions they have taken, which may be particularly relevant when a player character encounters an iconic non-player character after just playing through a scenario with them; admonishment anchor responses, which are used to admonish the player character for actions they have taken, which may have scenario and relationship variants; and redirection responses, which are employed to redirect a player to another general area or character, thus reinforcing the content line the player character is already on, emphasizing its importance.

Another potential personal contact response includes key moments responses, which again may be voice-overs or the like, and constitute specific responses non-player characters will use in corresponding specific scenarios.

As above, these responses may be in the form of voice-overs, visual effects, or a combination of the same.

For both personal contact and social communication, a given non-player character may have a range of responses, based on, e.g.: variety (to avoid repetition), relationship with the player character, and framing (to give context to what the player character is doing). For variety, i.e., in order to prevent too much repetition in phrases, each personal contact element may have, e.g., three variations, while social communication may vary as needed. Generally, shared history elements need not vary. To accommodate and account for differences in relationship with the non-player character, there may be provided a number of tiers of relationship: trusted, liked, neutral, disliked, or hated. Both personal contact and social communication may vary based on the tier. For framing, i.e., in order to frame the content users are playing, there may be location and scenario variants that allow the non-player character to give context to what the user is doing without specifically stating the same.

Yet another way to enhance the relationship of non-player characters to player characters, an implementation of which is shown in FIG. 5, is via shared history, which provides a way for a player character to learn more about a non-player character. In this way, the player character may become aware of information about a non-player character's past history or exploits, and in this way receive an impression of the non-player character beyond just what they hear from the non-player character. For example, the player character may find a newsreel with footage about the origin of the non-player character. Other examples may include family videos, audio recordings, press clippings, personal diaries, photographs, writings or artworks, or the like. These items may be collected in the player character's inventory, and replayed whenever the user desires.

Referring to a method 60 depicted by the flowchart of FIG. 5, a first step may include receiving a first signal indicating that a player character is within a predetermined distance from a shared history spawning point (step 116). This first step may include a step of receiving the first signal from the game engine (step 124), and/or the game database, as noted above in connection with FIG. 4.

A second step is to choose a media file to play (step 128). This step may also occur after a user clicks on an activatable element as described below in connection with step 118. The choice of media file may be by default or may be based on prior acts of the player character (step 134), as well as by other criteria. If prior acts are employed, the choice of media file may be based on quests or tasks performed by the player character, prior communications between the player character and the non-player character, or prior communications between the player character and other characters, e.g., player characters or non-player characters, or combinations of these. Also in this aspect, the choice of media file may have a degree of randomness (step 136), similar to steps 92 and 94 above. The choice of media file may also generally depend on whether the player has previously seen the media file, or whether the player has seen other shared history files which give a given media file context, e.g., "prerequisite" media files.

A next step is to transmit a second signal to the client computing device, the second signal in part causing the rendering of an activatable element pertaining to the non-player character (step 118). A part of this step may be accomplished, for example, by transmitting the second signal to a GPU or video card (step 126). This step provides an indication to the player that an opportunity for a shared history or background characterization has been offered.

As an example, in FIG. 1, a shared history spawning point is illustrated as the private home 28, and player characters within a proximity $R_{SH}$ may be enabled to see the activatable element 42, such as an icon. For example, the player character 34 may see the element 42, but not the player characters 32 and 33.

By activating or clicking on the activatable element, the next step is initiated, that of rendering and playing back a media file corresponding to the non-player character (step 122).

In one implementation, the step 122 may include a step of playing back a cinematic sequence or cut scene (step 132). "Playing back" steps, such as step 132, may include steps of sending the file to a renderer and performing a rendering step. Following playback, if appropriate, an item giving rise to the media file, e.g., a newsreel, may be placed in the player character's inventory and played back again at a subsequent time. Of course, not all shared history need be passive, e.g., watching media files. The same may involve dialogue with a non-player character or any other type of interaction in which history may be shared.

Whether social communication, personal contact, or shared history, the level of depth for which information about a non-player character is available may depend on the category of non-player character: primary, secondary, global, or generic. Primary characters, e.g., iconic non-player characters, may be provided with significant levels of all characterization types. Secondary characters serve a supporting role, and may be provided with more of one type of characterization than another, e.g., personal contact. Their social communication and shared history may be more limited, and may serve to support the primary characters. Global characters are similar to secondary ones, but have somewhat greater depth. These characters may be useful as information and content sources for player characters. Global characters may have some shared history and personal contact, but their focus may be social communication. Generic characters are ones that support the reality of a given scenario, and include firemen, policemen, thugs, and ordinary citizens. Such characters may have minimal personal contact, virtually no shared history, and their social communication may often be limited to specific scenarios. For example, a fireman may call for heroes to help fight a fire.

What have been described are systems and methods for managing the actions or responses of a digital entity in a simulation to reflect its interaction with a player character over time.

One implementation of the system and method includes one or more programmable processors and corresponding computer system components to store and execute computer instructions, such as to provide the server and client systems to operate the game environment and to monitor and control the data and interaction of non-player character's and player characters in the game environment. The modules, components, or portions thereof, may also be stored on one or more other servers, i.e., there is no requirement that all components be located on a common server, and in some cases certain components will be located on client computing devices.

Data may be tracked in various ways. In one implementation, the server stores data for a non-player character reflecting the past interactions with each player character and of events that are defined as relevant to the non-player character. For example, the system could store information about the state of the relationship between the two characters based on their last conversation and whether the player character helped the non-player character or not. Similarly, the system could store data reflecting significant events in the real world, such as the election of a president or the player's birthday, or in the game world, such as the player character's success or failure in a prominent mission or their joining a new organization. As part of maintaining the player character's data, various data about the player character will also be available to manage the non-player character reactions. For example, data such as the player's occupation, rank in an organization, age, and address could be used to form the non-player character's reaction. In this way, the non-player character will treat the player character more like a real person and, in turn, feel more like a real person to the player through its responses and reactions. Additional variations may be used depending on the nature of the game or system.

EXAMPLES

In one implementation, a server computer system in conjunction with one or more client computer systems provide an MMO that has a superhero theme where players create and use player characters which may be heroes or villains. The same may interact with superheroes or iconic villains. The following non-limiting examples are set in this milieu.

Example 1—Personal Contact

The player character, playing as a hero, may enter a dilapidated warehouse and find himself surrounded by enemies. He may go on the offensive, attempting to attack the group. An iconic non-player character superhero may then appear, defeating the group and calling the player character to follow the superhero deeper into the building.

Example 2—Social Communication

The player may be controlling a player character that is a minor villain. The player character may have pulled a few minor capers in the city. The player character's communicator may suddenly receive a communication from an iconic non-player character superhero, telling the player character that she has gone too far, and that the superhero will soon bring her to justice.

Example 3—Shared History

A hero or villain may find a newsreel depicting an important moment in the history of an iconic superhero. For example, in a grainy black-and-white picture it portrays a crime scene in an ally, with two victims lying prone and detectives taking photographs of the scene. The camera may pan to the superhero as a youth, watching the scene with emotion and being taken away to a new life.

It will be apparent to one of ordinary skill in the art, given this teaching, that variations in the above description will be encompassed by the scope of the claims. For example, the development system could be applied to other types of games, e.g., fantasy and science fiction games, or offline games. The event tracking could also apply to events that are defined in the game but do not directly involve the non-player character, e.g., a natural disaster that occurred in another location and causes the non-player character to have a new goal or request. In another example, a non-player character may use data reflecting indirect relationships as well, e.g., if the player character has done something beneficial for a friend of the non-player character, the non-player character may react favorably towards or mention the favor to the player character. Accordingly the scope of the invention is to be limited only by the claims appended hereto, and equivalents thereof.

What is claimed is:

1. A computer-readable medium, comprising instructions for causing a processor in an electronic device to perform a method of providing information about a non-player character to a player character in a simulation, the method comprising:
   receiving a first signal, the first signal indicating that a player character is within a predetermined distance from a spawning point;
   upon receipt of the first signal, transmitting a second signal to the client computing device, the second signal causing the client computing device to display an activatable element that, when activated, initiates rendering and playback of media that includes information about a non-player character; and
   upon receipt of a third signal corresponding to an activation of the displayed activatable element, transmitting a fourth signal to the client computing device, the fourth signal causing the client computing device to play back a media file that includes a level of available information about the non-player character;
   wherein the level of available information about the non-player character is dependent on a category of the non-player character.

2. The medium of claim 1, wherein the causing the client computing device to play back a media file includes choosing a media file to play, wherein the choosing includes choosing a media file based on one or more quests or tasks accomplished or attempted by the player character, one or more prior communications or interactions between the player character and the non-player character, or one or more prior communications or interactions between the player character and other player characters or non-player characters.

3. The medium of claim 2, wherein the choosing a media file to play further comprises choosing one of a plurality of media files at random.

4. The medium of claim 1, wherein the causing the client computing device to play back a media file includes causing the client computing device to play back a cinematic sequence or a cut scene.

5. The medium of claim 1, wherein the causing the client computing device to play back a media file includes choosing a media file to play, wherein the choosing includes choosing a media file based on an in-game event.

6. A computer-readable medium, comprising a system for providing information about a non-player character to a player character in a multiplayer game, the medium including the following modules:
   a database module for storing data about a plurality of player characters, a plurality of non-player characters, and a plurality of features in a game environment; and
   a response calculating module for calculating responses to player character interactions, wherein the response calculating module is configured to, upon receipt of a first signal indicating that a player character is within a predetermined distance from a spawning point, transmit a second signal to the client computing device, wherein the second signal causes a client computing device to display an activatable element that, when activated, initiates rendering and playback of media that includes information about a non-player character;
   wherein the response calculating module is configured to, upon receipt of a third signal corresponding to an activation of the displayed activatable element, transmit a fourth signal to the client computing device, the fourth signal causing the client computing device to play back a media file that includes a level of available information about the non-player character; and
   wherein the level of available information about the non-player character is dependent on a category of the non-player character.

7. The medium of claim 6, wherein the media file is a cinematic sequence.

8. A computer-implemented method of providing information about a non-player character to a player character in a simulation, the method comprising:
   receiving a first signal, the first signal indicating that a player character is within a predetermined distance from a spawning point;
   upon receipt of the first signal, transmitting a second signal to the client computing device, the second signal causing the client computing device to display an activatable element that, when activated, initiates rendering and playback of media that includes information about a non-player character; and
   upon receipt of a third signal corresponding to an activation of the displayed activatable element, transmitting a fourth signal to the client computing device, the fourth signal causing the client computing device to play back a media file that includes a level of available information about the non-player character;
   wherein the level of available information about the non-player character is dependent on a category of the non-player character.

9. The method of claim 8, wherein the causing the client computing device to play back a media file includes choosing a media file to play, wherein the choosing includes choosing a media file based on one or more quests or tasks accomplished or attempted by the player character, one or more prior communications or interactions between the player character and the non-player character, or one or more prior communications or interactions between the player character and other player characters or non-player characters.

10. The method of claim 9, wherein the choosing a media file to play further comprises choosing one of a plurality of media files at random.

11. The method of claim 8, wherein the causing the client computing device to play back a media file includes causing the client computing device to play back a cinematic sequence or a cut scene.

12. The method of claim 8, wherein the causing the client computing device to play back a media file includes choosing a media file to play, wherein the choosing includes choosing a media file based on an in-game event.

* * * * *